United States Patent Office 2,796,884
Patented June 25, 1957

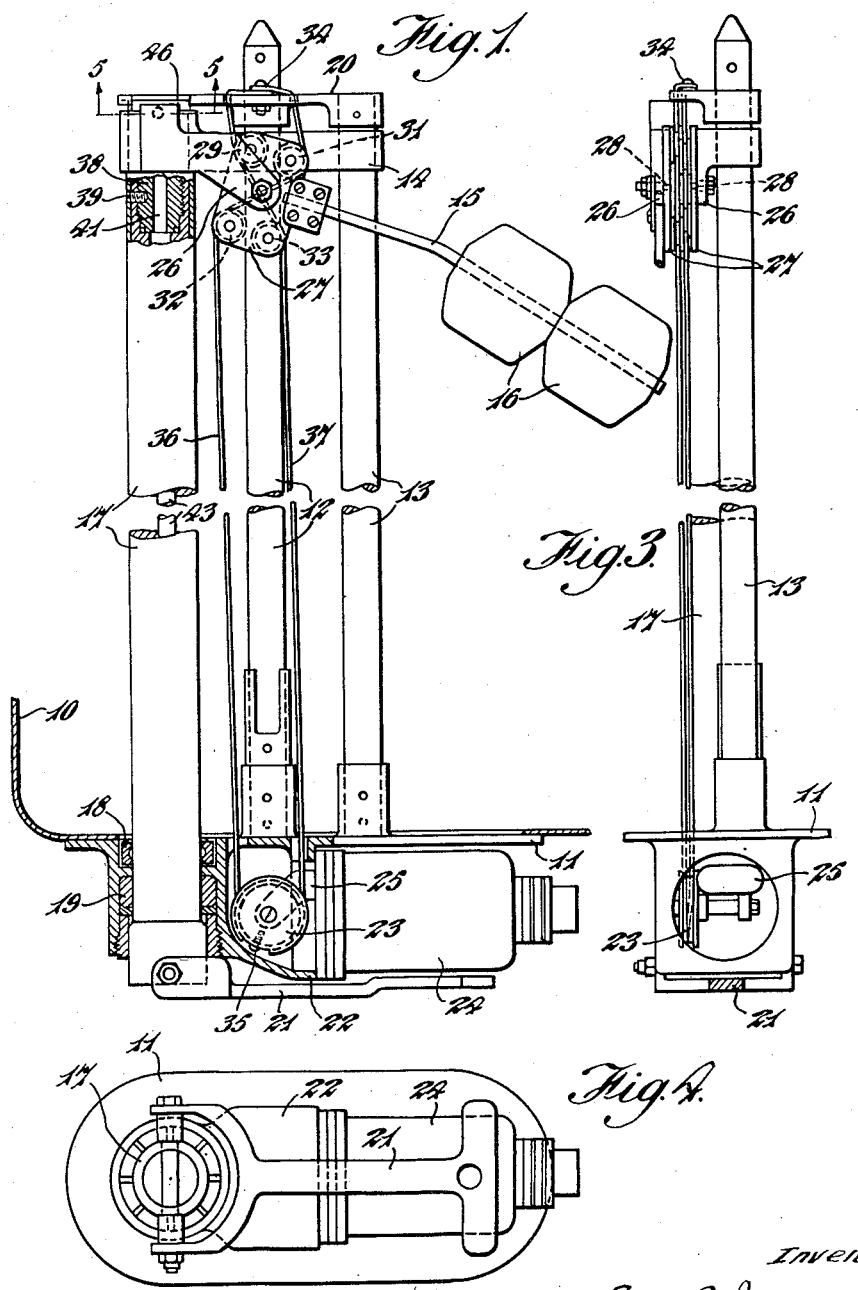

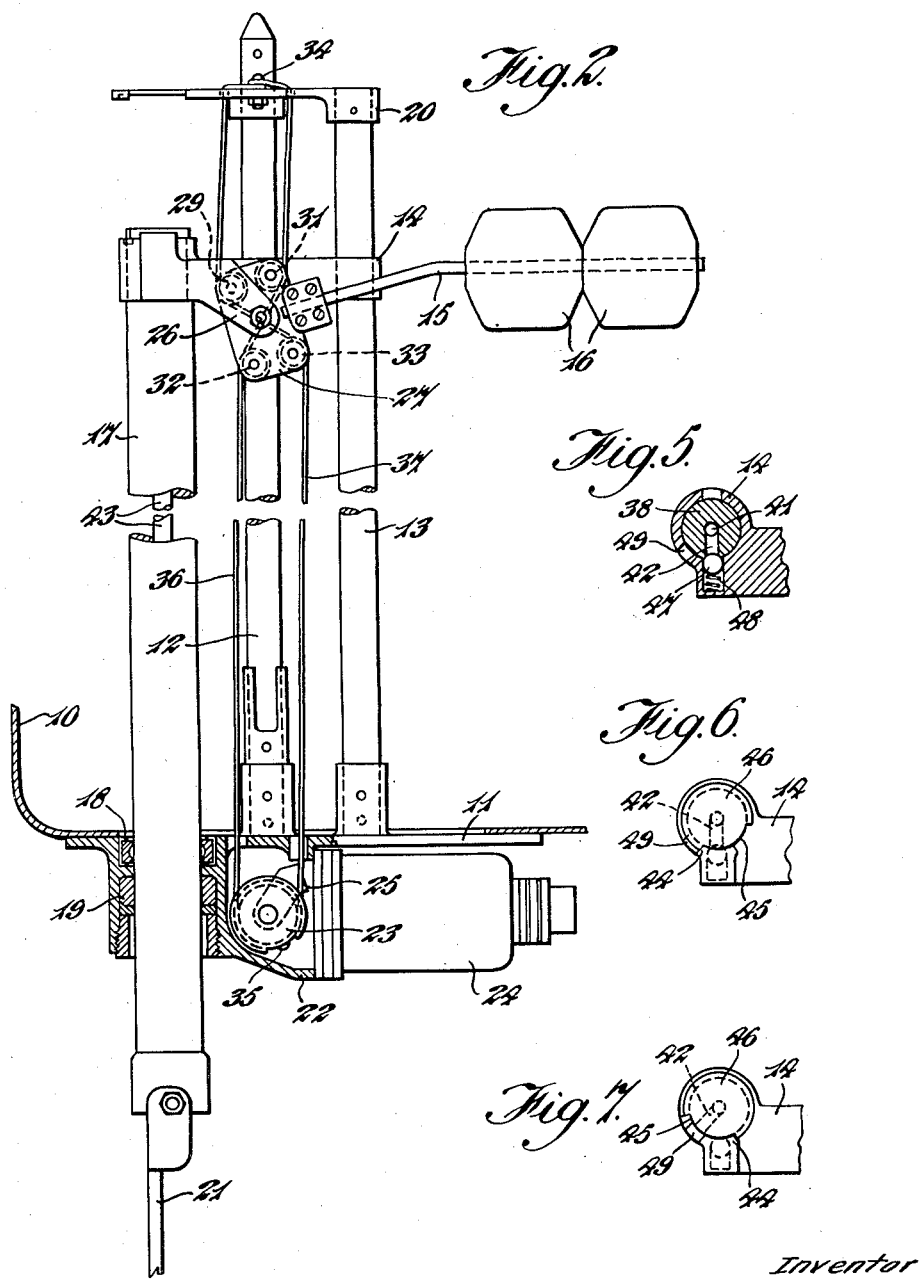

2,796,884

LIQUID LEVEL CONTROL DEVICE

Eric Cyril Jones, Tarrant Rawston, near Blandford, England, assignor to Flight Refueling Incorporated, Baltimore, Md., a corporation of Delaware Application August 24, 1954, Serial No. 451,737

Claims priority, application Great Britain
August 31, 1953

17 Claims. (Cl. 137—412)

This invention relates to liquid level controlling or indicating devices of the kind in which the filling of a tank or other receptacle is stopped automatically when the liquid reaches a predetermined level therein, or the attainment of the said predetermined level is indicated, by means responsive to the lifting of a float by the liquid in the receptacle.

The object of the invention is to provide a liquid level controlling or indicating device of the kind referred to in which the level of liquid in the receptacle at which the device becomes effective is readily adjustable.

According to the invention, in a liquid level controlling or indicating device of the kind referred to the float is carried by an arm pivotally mounted on a carriage guided for upward and downward movement in the receptacle, and a substantially inextensible tension member fixedly anchored adjacent one end of the path of movement of the carriage and connected adjacent the other end of the said path to a pivotally mounted member is led over guide members carried by the float arm and is laterally deflected by said guide members to a degree which varies with the pivotal movement of the float arm to vary the effective length of the said tension member and move the pivotally mounted member about its axis, the pivotally mounted member being arranged to operate an electric switch or other control device for a valve or indicator.

Two tension members are preferably provided, the said tension members being so arranged that a pull on one of them turns the pivotally mounted member in one direction and a pull on the other turns the pivotally mounted member in the opposite direction, the guide members carried by the float arm acting to reduce the effective length of one tension member when the float moves upwardly about its pivot, and to reduce the effective length of the other tension member when the float moves downwardly about its pivot.

The two tension members may be formed by a single length of flexible material passing round a pulley which constitutes the pivotally mounted member.

The invention is hereinafter described with reference to the accompanying drawings, in which:

Figure 1 is a side elevation of one form of device according to the invention;

Figure 2 is a side elevation similar to Figure 1, showing the parts in another position;

Figure 3 is a side elevation looking from the right-hand side of Figure 1;

Figure 4 is an underneath plan view;

Figure 5 is a sectional plan view on the line 5—5 of Figure 1; and

Figures 6 and 7 are detail plan views.

Referring to the drawings, a part of the wall of a receptacle such as a fuel tank is shown at 10 in Figures 1, 2 and 3, and a cover plate 11 closing an aperture in the bottom of the tank supports two upstanding tubular pillars 12 and 13 on which is slidably mounted a carriage 14, a float arm 15 being pivotally mounted on the carriage 14, and carrying a float 16. Also secured to the carriage 14 is a dependent tube 17 which extends downwardly through an opening in the cover plate 11, packings 18 and 19 being provided in the opening to prevent leakage of liquid.

To the lower end of the dependent tube 17 is pivotally connected a handle 21 by means of which the tube 17, and therefore the carriage 14 can be moved up and down the pillars 12 and 13. The upper ends of the pillars 12 and 13 are connected one to the other by a member 20.

Formed integral with the cover plate 11 is a housing 22 in which is pivotally mounted a pulley 23, the housing 22 having an opening in one side. An electric switch casing 24 secured to the housing 22 has one wall formed by a thin, non-magnetic diaphragm which extends across the opening in the housing 22, a contact operating member in the switch casing carrying a permanent magnet co-operating with a magnetic armature 25 moving with the pulley 23, and the arrangement being such that when the armature 25 approaches the diaphragm the attraction between it and the magnet moves the contact operating member to actuate the switch in one direction, whilst movement of the armature away from the diaphragm results in a decrease of the magnetic force acting between the armature and the magnet and so allows the switch to move in the opposite direction under the load of a spring, weight or other suitable return device.

The float arm 15 is pivotally mounted between two arms 26 on the carriage 14, the pivoted end of the float arm comprising two spaced rectangular plates 27 each having an aperture at its centre into which projects a pivot pin 28 projecting inwardly from the adjacent arm 26. Four pulleys 29, 31, 32 and 33 are mounted between the plates 27, one adjacent each corner of the plates. A length of flexible but substantially non-extensible wire having both its ends clamped to the member 20 by a screw 34 passes downwardly alongside the pillar 12, and forms a bight around the pulley 23, to which it is secured by a screw 35 to prevent slipping. The wire thus forms two tension members 36 and 37, a pull on the tension member 36 tending to rotate the pulley 23 in one direction, whilst a pull on the tension member 37 tends to rotate the pulley in the opposite direction. The tension member 36 is led from the anchorage at the screw 34 round the outer side of the pulley 31, diagonally across the space between the plates 27 and round the outer side of the pulley 32, whilst the tension member 37 is led from the anchorage round the outer side of the pulley 29, diagonally across the space between the plates 27 and round the outer side of the pulley 33. The two tension members thus cross one another at the centre of the plates 27, and it will be seen that movement of the float arm 15 about its pivot will vary the effective lengths of the two tension members 36 and 37 in opposite senses, and will thus produce partial rotation of the pulley 23. The float arm is shown in Figure 1 in the position which it assumes when the float is not supported by liquid in the tank, the armature 25 then being positioned close to the diaphragm so that the magnet is attracted. In Figure 2, the float has been raised by the liquid, causing the pulley 23 to rotate in an anti-clockwise direction and move the armature 25 away from the diaphragm to release the magnet. The switch may control the electrical circuit of an indicator device such as a lamp, which may be either illuminated when the liquid in the tank reaches the desired level and unlighted when the liquid is below that level, or may be illuminated when the liquid is below the desired level, and extinguished when the desired level is reached. Alternatively, the electrical circuit controlled by the switch may include a solenoid or like means operating a valve to shut off the supply of liquid to the tank when liquid being supplied thereto reaches the desired level.

The level of liquid at which the switch operates can be varied by vertical movement of the tube 17, which is conveniently graduated to show the quantity of liquid necessary to lift the float and operate the switch for any position of the carriage 14. It will be apparent that, as the carriage 14 is moved, the pulleys 29, 31, 32 and 33 will merely ride up or down the tension members 36 and 37, but will have no effect on the relative effective lengths of the said members. The carriage 14 is shown in Figure 1 at the top of its travel, and in Figure 2 at a lower position.

The tube 17 is secured to the carriage 14 by a plug 38 which passes through a hole in the carriage and is screwed into the top of the tube 17, the plug being locked to the tube 17 by a grub-screw 39. The plug 38 is formed with an axial bore 41 extending upwardly from its lower end to meet a radial bore 42 (Figures 5 to 7), and a tube 43 leads downwardly from the bore 41 and extends to the open lower end of the tube 17. The tube 17 is free for limited turning movement in the carriage 14, the movement being limited by a stop 44 on the carriage 14 projecting into a notch 45 in the edge of a head 46 on the plug 38, and, in one extreme position of the tube 17, the radial bore 42 is obturated by a ball 47 located in a recess in the carriage and urged against the side of the plug 38 by a spring 48. In the other extreme position of the tube, the bore 42 in the plug registers with a notch 49 in the carriage 14, and so connects the bore 42, and through it the tube 43, to the interior of the tank at a level slightly above that at which the liquid acts on the float to operate the switch. Thus, by setting the tube 17 to the correct angular position, an indication of overfilling is obtained, since liquid will escape down the tube 43 if the level continues to rise after the switch has been operated.

The handle 21, as shown in Figures 1 and 2, is pivotally attached to the lower end of the tube 17, so that it can be moved to the stowed position shown in those figures when it is not in use.

The tension members 36 and 37 may be formed by two separate lengths of wire or like material, and the pulley 23 may be replaced by a rocking arm. Alternatively, only one tension member may be provided, the effective length of which is controlled by two pulleys on the float arm corresponding to the pulleys 29 and 33 or 31 and 32, the pulley 23 or equivalent member having associated with it resilient means tending to rotate it in such a direction as to keep the tenison member stressed.

In operation, the carriage 14 is set to a position such that the switch in the casing 24 will be operated when the desired quantity of liquid is in the tank. The float 16 being unsupported, the float arm assumes the position shown in Figure 1, so that the tension member 36 is shortened relative to the tension member 37, and the armature 25 is rocked towards the diaphragm of the switch casing. When liquid is supplied to the tank, the float is lifted as the level therein approaches that corresponding to the desired quantity, and the plates 27 are moved to shorten the tension member 37 and lengthen the tension member 36, until the switch operates. If the switch controls an indicator, the said indicator is then operated to show that the desired quantity of liquid, is in the tank, or, if the switch controls a valve, the latter is closed to prevent further liquid from entering. During the filling operation, the tube 17 is set to the angular position shown in Figure 7, so that if the switch fails to operate the indicator or valve, or, in the case of an indicator, the attendant fails to observe that it has been operated, escape of liquid through the pipe 43 indicates that the tank is being over-filled.

I claim:

1. A variable liquid level control device for a receptacle comprising a vertically disposed rigid member disposed for vertical adjustment through a packed opening in a wall of the receptacle, a float rod within the receptacle, means pivotally connecting said float rod to said rigid member for vertical swinging movement, whereby said pivotal connection will be adjusted vertically with the rigid member, a float carried by said rod eccentrically to said pivotal connection, a controlled member mounted for rotary movement about a fixed axis relative to said receptacle, a generally vertically disposed flexible tension element connected to said controlled member eccentrically to said fixed axis and anchored to a fixed point within the receptacle, and a pair of generally vertically spaced guides fixedly associated with said float rod in vertically movable relation to said flexible element, the said flexible element passing on opposite sides of the respective guides, whereby swinging movement of the float rod and its guides in one direction will cause the guides to laterally offset different portions of the flexible element and thereby shorten the effective length of one of said portions to move said controlled member.

2. A variable liquid level control device for a receptacle comprising a vertically disposed rigid member disposed for vertical adjustment through a packed opening in a wall of the receptacle, a float rod within the receptacle, means pivotally connecting said float rod to said rigid member for vertical swinging movement, whereby said pivotal connection will be adjusted vertically with the rigid member, a float carried by said rod eccentrically to said pivotal connection, a controlled member mounted for movement relative to said receptacle and means guiding same for such movement, a generally vertically disposed flexible tension element connected to said controlled member and anchored to a fixed point within the receptacle, and a pair of generally vertically spaced guides fixedly associated with said float rod in vertically movable relation to said flexible element, the said flexible element passing on opposite sides of the respective guides, whereby swinging movement of the float rod and its guides in one direction will cause the guides to laterally offset different portions of the flexible element and thereby shorten the effective length of one of said portions to move said controlled member.

3. A variable liquid level control device for a receptacle comprising a vertically disposed rigid member disposed for vertical adjustment through a packed opening in a wall of the receptacle, a float rod within the receptacle, means pivotally connecting the said float rod to said rigid member for vertical swinging movement, whereby said pivotal connection will be adjusted vertically with the rigid member, a float carried by said rod eccentrically to said pivotal connection, a controlled member mounted for movement relative to said receptacle, means guiding same for such movement, a generally vertically disposed flexible tension element connected to said controlled member and anchored to a fixed point within the receptacle, a guide means fixedly associated with said float rod in vertical spaced relation to said pivotal connection and in vertically movable relation to said flexible element, the said flexible element passing adjacent said guide means on opposite sides of the said guide means, whereby swinging movement of the float rod and its guide means in one direction will cause the guide means to laterally offset a portion of the flexible element and thereby to shorten the effective length of same to move said controlled member.

4. The combination of claim 3 including a pair of flexible tension elements relatively connected to said controlled member to apply tension thereto from opposite directions, both of said tension elements being anchored to fixed points within the receptacle and having portions extending generally vertically within the receptacle on opposite sides of said guide means whereby swinging movement of the float rod in opposite directions will cause said guide means to alternately laterally deflect said tension elements to move the controlled element in opposite directions.

5. A liquid level control device for a receptacle comprising a support normally fixed within the receptacle, a float arm pivotally connected to said support for vertical swinging movement, a float carried by said arm eccentrically to said pivotal connection, a controlled member and means mounting same for movement relative to said receptacle, a flexible tension element connecting said controlled member to a fixed point within said receptacle, a guide means fixedly associated with said float arm in spaced relation to the pivotal connection thereof for swinging movement transversely to and into engagement with the medial portion of said flexible tension element, whereby the resulting lateral displacement of said medial portion will transmit controlling motion to said controlled member.

6. The combination of claim 5 wherein said controlled member comprises a pulley mounted for rotary movement about a fixed axis, and the flexible tension element is passed partially around and connected to the periphery of said pulley.

7. A liquid level control device for a tank comprising, in combination, a support movable vertically in said tank, a float rod, means pivotally connecting said float rod to the support for vertical adjustment with the support and for vertical angular movement relative to the support, a float carried by said rod in spaced relation to the axis of angular movement of said rod for causing angular movement of said rod responsive to variations in the level of liquid within the tank, and a member mounted for pivotal movement relative to the tank and connected to said float rod for rotary movement thereby; in response to the attainment of a predetermined level of liquid in the tank, as determined by the vertical adjustment of the support and the angular position of said float rod.

8. The device as set forth in claim 7 in which means accessible from without the tank extends into the tank and is connected to said connecting means for adjusting the position of the axis of angular movement of said float rod in accordance with the desired level of liquid.

9. The device according to claim 8 in which said tank is provided with an opening and said adjusting means comprises an elongated vertically extending member extending adjustably through said opening.

10. A liquid level control device for a tank comprising, in combination, a vertical support, a tiltable frame, means connecting the tiltable frame to the support for vertical adjustment and for vertical angular movement, a float and means connecting the same to said frame in spaced relation to the axis of angular movement of the frame, for causing angular movement of the frame responsive to variations in the level of liquid within the tank, a member mounted for pivotal movement relative to the tank, a controlled member mounted for movement relative to said tank, and a funiform element operatively connecting said frame with said controlled member, whereby upon tilting of the said frame said funiform element is pulled to move said controlled member.

11. A liquid level controlling or indicating device for a receptacle comprising a carriage, an arm pivotally mounted on said carriage for vertical swinging movement, guide members carried by the arm, means guiding the carriage for upward and downward movement in the receptacle, a member mounted for pivotal movement adjacent one end of the path of movement of the carriage, and a substantially inextensible tension member fixedly anchored adjacent the other end of the path of movement of the carriage and connected to said pivotally mounted member, said tension member being led over said guide members for lateral deflection by said guide members to a degree which varies with the pivotal movement of the float arm to vary the effective length of the said tension member and move the pivotally mounted member about its axis, the pivotally mounted member being arranged to operate a control device.

12. A liquid level controlling or indicating device according to claim 11, wherein the guide members carried by the float arm are disposed to define two pairs of relatively oppositely diagonally spaced guide surfaces, and two tension members are provided, said members respectively extending around separate pairs of said guide surfaces from their points of anchorage and thence in opposite directions around said pivotally mounted member to their respective connections with said member, whereby the said guide members will act when the float moves upwardly about its pivot, and to reduce the effective length of the other tension member when the float moves downwardly about its pivot.

13. A liquid level controlling or indicating device according to claim 12, wherein the two tension members are formed by a single length of flexible material passing round a pulley which constitutes the pivotally mounted member.

14. A liquid level controlling or indicating device according to claim 12, wherein the float arm carries four guide pulleys mounted at the corners of a rectangle having its centre coincident with the pivot of the said arm, and each of the tension members engages two diagonally opposite pulleys so that the said tension members cross each other between the pulleys.

15. A liquid level controlling or indicating device according to claim 11, wherein means operable from the exterior of the container are provided to move the carriage upwardly and downwardly in the container.

16. A liquid level controlling or indicating device according to claim 11, wherein a tube moving upwardly and downwardly with the carriage provides an escape path for liquid delivered in excess of the desired quantity if the flow is not stopped in response to the operation of the control device.

17. A liquid level controlling or indicating device according to claim 16, wherein means are provided for closing the tube forming the escape path for excess liquid.

References Cited in the file of this patent

UNITED STATES PATENTS 2,145,602    Kirgan _____ Jan. 31, 1939